(12) United States Patent
Malek et al.

(10) Patent No.: US 6,253,207 B1
(45) Date of Patent: *Jun. 26, 2001

(54) METHOD AND APPARATUS FOR TRANSPORTING MULTIMEDIA INFORMATION OVER HETEROGENEOUS WIDE AREA NETWORKS

(75) Inventors: Manu Malek, Colts Neck; Kazem Anaraky Sohraby, Lincroft, both of NJ (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/936,386

(22) Filed: Sep. 25, 1997

(51) Int. Cl.$^7$ .................................................. G06F 17/30
(52) U.S. Cl. .......................... 707/104; 707/10; 707/502; 345/302; 345/346; 345/348; 345/349; 345/435; 345/967; 709/200; 709/202; 709/218; 709/229; 709/328
(58) Field of Search .......................... 707/104, 10, 502; 395/200.37; 345/302, 346, 349, 967, 348, 435; 709/200, 202, 218, 229, 328

(56) References Cited

U.S. PATENT DOCUMENTS

| | | | |
|---|---|---|---|
| 5,164,938 | * 11/1992 | Jurkevich et al. | 370/60 |
| 5,200,952 | * 4/1993 | Bernstein | 370/79 |
| 5,229,992 | * 7/1993 | Jurkevich et al. | 370/82 |
| 5,247,516 | * 9/1993 | Bernstein et al. | 370/82 |
| 5,282,202 | * 1/1994 | Bernstein et al. | 370/94.1 |

(List continued on next page.)

OTHER PUBLICATIONS

L. Ehley et al., "A Survey of Multimedia Synchronization Techniques," IEEE (1995).

Hussain et al., "A Novel Two–Queue Model for ATM Networks," IEEE Globecom (1997).

(List continued on next page.)

Primary Examiner—Hosain T. Alam
Assistant Examiner—Jean M. Corriélus
(74) Attorney, Agent, or Firm—Ryan, Mason & Lewis, LLP (57) ABSTRACT

A method and apparatus for separately transporting each monomedia stream of a composite multimedia signal across a network, such as an ATM network, is disclosed. The transport of monomedia traffic over different network segments, which may or may not support all multimedia components, is disclosed. Each monomedia component, n, such as video, voice and data, of the multimedia session is separately transmitted over a connection having a capacity, $C_n$. The capacity, $C_n$, is generally specified in number of units of information, such as the bandwidth that should be allocated to the respective monomedia component for the duration of the call, or the number of ATM cells per unit time for the duration of the call. In an illustrative ATM network implementation, individual connections can be established for each monomedia component by assigning separate VP/VC identifiers to each monomedia connection. Jitter, due to synchronization problems, is controlled by allocating appropriate bandwidth to each monomedia component. In a preferred embodiment, the respective value of each monomedia connection capacity, $C_n$, is adjusted so that the jitter among the individual monomedia components is minimized. The capacity, $C_n$, assigned to each monomedia connection is preferably based on the types of media included in the session, and current network conditions and can be obtained from experimental or statistical profiles of various multimedia type sessions, or dynamically adjusted based on network traffic conditions.

28 Claims, 8 Drawing Sheets

U.S. PATENT DOCUMENTS

| | | | |
|---|---|---|---|
| 5,282,207 | * | 1/1994 | Jurkevich et al. .................... 370/110 |
| 5,530,806 | * | 6/1996 | Condon et al. ................. 395/185.02 |
| 5,532,937 | * | 7/1996 | Graziano et al. .................... 364/514 |
| 5,553,222 | * | 9/1996 | Milne et al. ......................... 395/806 |
| 5,590,126 | * | 12/1996 | Mishra et al. ....................... 370/329 |
| 5,623,605 | * | 4/1997 | Keshav et al. .................. 395/200.17 |
| 5,659,793 | * | 8/1997 | Escobar et al. ..................... 395/807 |
| 5,689,641 | * | 11/1997 | Ludwig et al. ...................... 709/241 |
| 5,758,079 | * | 5/1998 | Ludwig et al. ...................... 709/204 |
| 5,758,085 | * | 5/1998 | Kouoheris et al. ............. 395/200.61 |
| 5,774,466 | * | 6/1998 | Hamamoto et al. ................. 370/416 |
| 5,808,767 | * | 9/1998 | Williams et al. .................... 359/152 |
| 5,809,299 | * | 9/1998 | Cloutier et al. ..................... 707/104 |
| 5,809,512 | * | 9/1998 | Kato .................................... 707/502 |
| 5,813,014 | * | 9/1998 | Gustman .............................. 707/103 |
| 5,854,893 | * | 12/1998 | Ludwig et al. ...................... 709/204 |
| 5,857,189 | * | 1/1999 | Riddle .................................... 707/10 |
| 5,867,494 | * | 2/1999 | Krishnaswamy et al. ........... 370/352 |
| 5,907,704 | * | 5/1999 | Gudmundson et al. ............. 395/701 |
| 5,918,010 | * | 6/1999 | Appleman et al. .................. 709/203 |
| 6,084,858 | * | 7/2000 | Matthews et al. ................... 370/238 |
| 6,097,726 | * | 8/2000 | Puntambekar et al. .............. 370/397 |

OTHER PUBLICATIONS

Hussain et al., "Spatial Correlation in Real–Time Video Conference Traffic," IEEE Symp. on Computer Communications (ISCC) (1997).

P.W. Jardetzky et al., "Storage and Synchronization for Distributed Continuous Media," ACM/Springer–Verlag Multimedia Journal (1995).

C.J. Sreenan, "A Service Oriented Approach to Continuous Media Synchronization," Proc. of IEEE INFOCOM (Jun. 1994).

* cited by examiner

CAPACITY ALLOCATION TABLE
600 →

| | CONNECTION TYPES | | | NORMALIZED PATH TRAFFIC 650 | BANDWIDTH ALLOCATION | | |
|---|---|---|---|---|---|---|---|
| MULTIMEDIA SCENARIO 630 | VIDEO 635 | VOICE 640 | DATA 645 | | $C_1$ 655 | $C_2$ 660 | $C_3$ 665 |
| 1 | X | X | - | .7 | .7 | .2 | - |
| 2 | X | X | X | .3 | .9 | .3 | .5 |
| 3 | - | X | X | .9 | - | .2 | .03 |
| 4 | X | - | - | .5 | .4 | - | - |

METHOD AND APPARATUS FOR TRANSPORTING MULTIMEDIA INFORMATION OVER HETEROGENEOUS WIDE AREA NETWORKS

FIELD OF THE INVENTION

The present invention relates to a network communication system, and more particularly, to a method and apparatus for separately transporting each monomedia stream of a composite multimedia signal across heterogeneous networks, including an ATM network.

BACKGROUND OF THE INVENTION

The use of broadband networks, such as asynchronous transfer mode (ATM) networks, for the transfer of multimedia information, such as video, voice and data, has become increasingly popular due to the high data rate and flexibility associated with such networks. ATM networks, for example, utilize a cell-oriented switching and multiplexing technique, and are based upon the use of short fixed-length "cells". ATM and other broadband networks have been embraced by the computer and telecommunication industries for networking existing and future multimedia applications, such as video conferencing, video-on-demand, and telephone applications.

An ATM network is a connection-oriented network, in which each transfer of information between a source device and a destination device is preceded by a call to a network connection manager to establish a connection, often referred to as a virtual channel, between the devices. Thus, the route between the devices is established prior to data transfer, and the connection is held during the entire transmission. The basic concept in establishing an end-to-end connection in an ATM network is the request for a series of virtual channel links from the source device to the destination device. The virtual channel (VC) on each link of the overall connection is identified in each transmitted cell by a virtual channel identifier (VCI) in the cell header, as well as by a virtual path identifier (VPI), which identifies the virtual path (VP) to which the virtual channel belongs. Thus, in order to route arriving cells, each switching node in an ATM network will typically include a routing translation table, which provides the VPI/VCI translation information for the switching node.

Currently, multimedia information may be transmitted across ATM and other networks to an end user by means of an integrated transport protocol, whereby the various monomedia components within the composite multimedia signal are encoded and transported together. This integrated transport approach, however, imposes several limitations, which, if overcome, could greatly expand the flexibility and quality of multimedia communications, particularly across heterogeneous networks. For example, it is not expected that all end-user devices and network service subscribers would desire, or be capable of accessing, all monomedia components in a multimedia presentation. For example, in a conference call, some end users may desire to access only voice and data, or just voice, and not video.

In addition, in the end-to-end path of multimedia sessions, heterogeneous network technologies, such as switches with different switch fabrics or diverse transport links, hereinafter referred to as "network segments," may be involved. For subscribers and locations where all switch fabrics and links are not available, only a subset of monomedia elements of a multimedia session may be supported. For example, if one or more network segments are wireless, the radio access (or the wireline portion of the wireless network) may only support voice, and not support data or video.

Furthermore, an integrated transport approach requires the same compression technique to be applied to each monomedia component of the composite multimedia signal. Thus, with an integrated transport approach, media specific compression techniques, which may be more efficient, cannot be directly exploited.

An important characteristic of a multimedia traffic session is the timing relationship between each monomedia component within the composite multimedia signal. If the inter-stream synchronization, or temporal correlation between monomedia streams, is not properly maintained throughout the transmission and processing of a multimedia application, the presentation will not be properly synchronized and will exhibit jitter. This problem arises due to the random delay in wide-area networks as monomedia information segments traverse through the network and interact with traffic from other sources.

As apparent from the above-described deficiencies with conventional systems for transporting multimedia information, a need exists for an improved method and apparatus for separately transporting each monomedia stream of a composite multimedia signal across a network, such as an ATM network. A further need exists for a multimedia communication system providing improved inter-stream synchronization between monomedia streams.

SUMMARY OF THE INVENTION

Generally, according to one aspect of the present invention, a method and apparatus for separately transporting each monomedia stream, such as video, voice and data, of a composite multimedia signal across heterogeneous networks, including an ATM network, is disclosed. Thus, the transport of monomedia traffic from a multimedia session over different network segments to different end users, which may or may not support or desire all multimedia components, is possible.

A network access node, where access to the network takes place, separately transmits each monomedia component, n, such as video, voice and data, of the multimedia session to a different connection having a capacity, $C_n$. The capacity, $C_n$, is generally specified in number of units of information, such as ATM cells per unit time. The values of capacity, $C_n$, affect the timing and spatial correlation among monomedia components. In an illustrative ATM network environment, individual connections can be established for each monomedia component by assigning separate VP/VC identifiers to each monomedia connection. The composite multimedia signal in an ATM network is also preferably assigned a unique VP/VC encapsulation identifier, hereinafter referred to as a "VP&CI," which is mapped to the identifiers of the individual VP/VC identifiers assigned to each monomedia component within the composite multimedia signal. The VP&CI may be conveyed to the destination nodes with the header information, or by means of signaling techniques. In a circuit switched network, individual monomedia connections preferably have a unique identification, such as a telephone number, and connections are established by dialing the telephone number of the particular monomedia session. At the destination node or the destination device itself, the separate monomedia streams are recombined into the composite multimedia stream.

According to a further aspect of the invention, jitter, due to synchronization problems, is controlled by allocating appropriate bandwidth to each monomedia component. In a preferred embodiment, the respective value of each monomedia connection capacity, $C_n$, is adjusted so that the jitter among the individual monomedia components is minimized. The capacity, $C_n$, assigned to each monomedia connection can be obtained from experimental or statistical profiles of various multimedia type sessions stored in a capacity allocation table. When a call request arrives at a network node during call admission, the capacity allocation table is accessed to assign capacity values, $C_n$, to each monomedia connection based on the types of media included in the session, and current network conditions. The capacity, $C_n$, corresponds to the bandwidth that should be allocated to the respective monomedia component for the duration of the call.

A more complete understanding of the present invention, as well as further features and advantages of the present invention, will be obtained by reference to the following detailed description and drawings.

DETAILED DESCRIPTION

Figure 1:
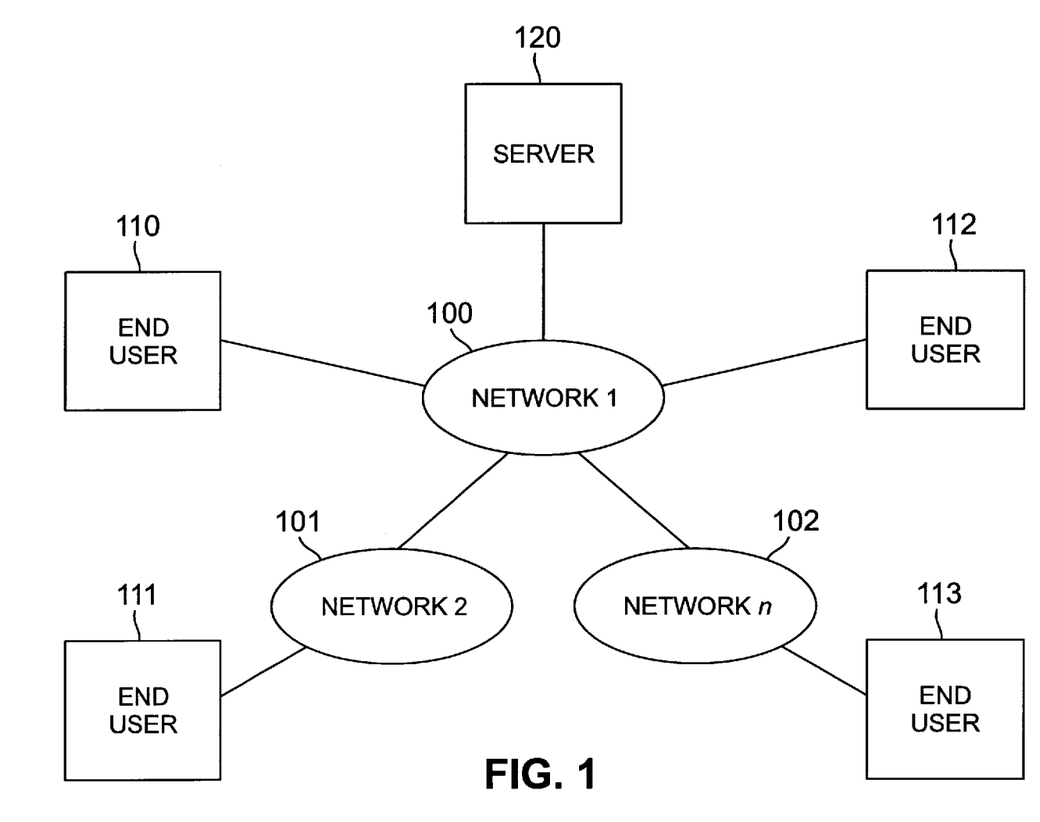
FIG. 1 illustrates a block diagram of a broadband network, such as an ATM network, suitable for transferring information from a source device to one or more destination devices.

FIG. 1 shows an illustrative network environment 100–102 for transferring multimedia information, such as video, voice and data, between one or more sources and destinations, such as end users 110–113 and server 120. Each end user 110–113, such as end user 110, may not desire, or be capable of accessing, all monomedia components of a given composite multimedia session. Although the network environment 100–102 is primarily illustrated herein as an asynchronous transfer mode (ATM) network, other suitable networks or heterogeneous combinations thereof may be utilized, such as circuit and packet switch networks, as well as other broadband networks, as would be apparent to a person of ordinary skill.

According to one feature of the present invention, each component monomedia stream of a composite multimedia signal is separately transported across the network 100. In this manner, the transport of monomedia traffic over different network segments, which may or may not support all multimedia components, is possible. The networks 100–102, such as an illustrative ATM network 100, are comprised of a plurality of network nodes, discussed below in conjunction with FIGS. 3 and 4, interconnected by a plurality of data links. Thus, at a network node 300, which may be a switch or a multiplexer, where access to the network 100 takes place, each monomedia component, n, such as video, voice and data, of the multimedia session is separately transmitted to a different connection having a capacity, $C_n$. The capacity, $C_n$, is generally specified in number of units of information, such as ATM cells per unit time. As discussed further below, the respective values of capacity, $C_n$, affect the timing and spatial correlation among monomedia components.

In the illustrative ATM network environment 100, individual connections can be established for each monomedia component by assigning separate VP/VC identifiers to each monomedia connection. It is noted that the different monomedia components may not travel the same physical path across the network 100. In one embodiment, the composite multimedia signal in an ATM network is also assigned a unique VP/VC encapsulation identifier. The VP/VC encapsulation identifier is mapped to the identifiers of the individual VP/VC identifiers assigned to each monomedia component within the composite multimedia signal. Alternatively, in a circuit switched network, individual monomedia connections preferably have a unique identification, such as a telephone number, and connections are established by dialing the telephone number of the particular monomedia session. In this manner, each intermediate network node 300 preferably examines the header information included in each monomedia component indicating the address of the destination device. At the destination node or the destination device itself, the separate monomedia streams are recombined into the composite ultimedia stream.

According to a further feature of the present invention, jitter, due to synchronization problems, is controlled by allocating appropriate bandwidth to each monomedia component. In a preferred embodiment, the respective value of each monomedia connection capacity, $C_n$, is adjusted so that the jitter among the individual monomedia components is minimized. The capacity, $C_n$, assigned to each monomedia connection can be obtained from experimental or statistical profiles of various multimedia type sessions stored in a capacity allocation table 600, discussed below in conjunction with FIG. 6. Thus, when a call request arrives at a network node 300 during the call admission, the capacity allocation table 600 is accessed to assign capacity values, $C_n$, to each monomedia connection based on the types of media included in the session, and current network conditions. The capacity, $C_n$, corresponds to the bandwidth that should be allocated to the respective monomedia component for the duration of the call.

In the illustrative embodiment, the end users 110–113 can utilize work stations (not shown), as well as other general-purpose devices, such as a telephone system or a videophone system. The server 120 may be embodied, for example, as a file server, a music server, or a video-on-demand system.

Figure 2:
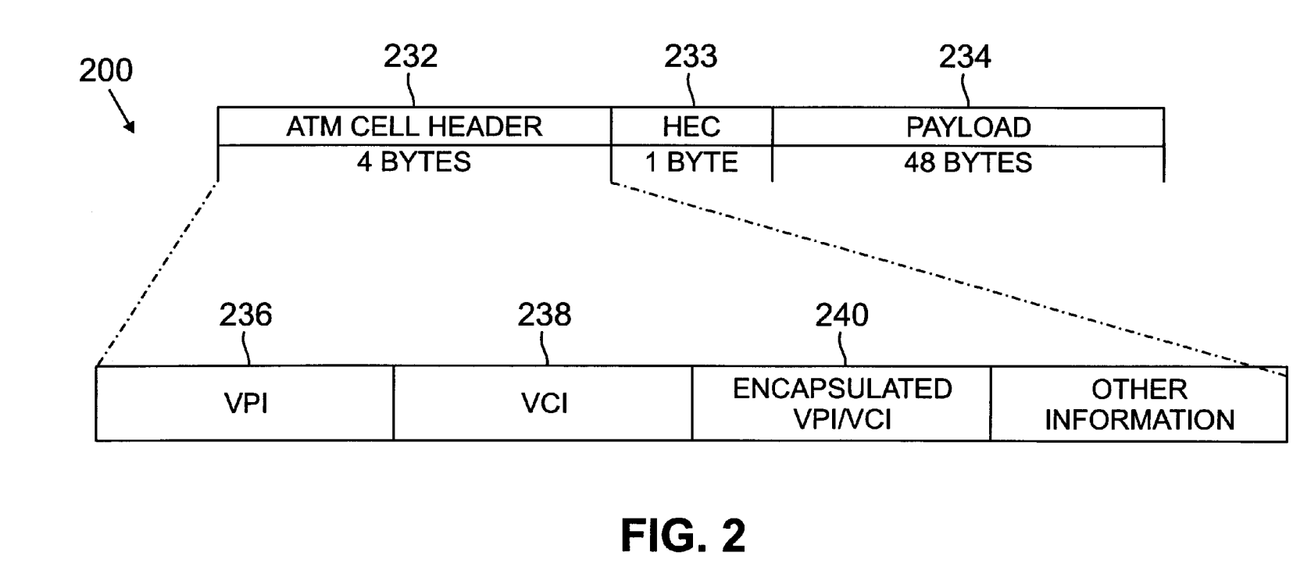
FIG. 2 illustrates the cell format definition for the ATM network of FIG. 1.

As is well known, an ATM network, such as the network 100, is a connection-oriented cell-switching network. The multimedia information transmitted through the network 100 is organized into short, fixed-length cells, in order to provide low latency. The cell format associated with the ATM standard is shown in FIG. 2. For a more detailed description of the ATM cell format standard, see CCITT Recommendations I.361, *B-ISDN ATM Layer Specification*, Study Group XVIII, Report R-116, 2, pp. 2–9 (July 1992), incorporated herein by reference.

Generally, as shown in FIG. 2, each ATM cell 200 has a fixed length of 53 bytes, comprised of a four byte cell header 232, a one byte header error control (HEC) 233 and a 48 byte cell payload 234. The HEC 233 is a Cyclic Redundancy Check (CRC) of the header information which is processed by the physical layer to detect errors in the header 232, allowing for correction of single-bit errors, or detection of multiple bit errors. The payload 234 contains user information, signaling information or operation, administration and maintenance (OAM) information. The header 232 includes the routing information and priority control information associated with the cell 200. Under the ATM standard, the header 232 includes an eight bit Virtual Path Identifier (VPI) field 236 and a 16 bit Virtual Channel Identifier (VCI) field 238. In addition, according to a feature of the present invention, the header 232 preferably includes a field designated herein as an "encapsulated Virtual Path and Circuit Identifier (VP&CI) 240" which is mapped to the identifiers of the individual VP/VC identifiers assigned to each monomedia component within the composite multimedia signal. As indicated above, the information in the VPI and VCI fields 236, 238 is used by the nodes in the network 100 to forward a received cell to the appropriate next stage of the network 100. It is noted that for a leaf node, the VPI and VCI will indicate a local process.

Figure 8:
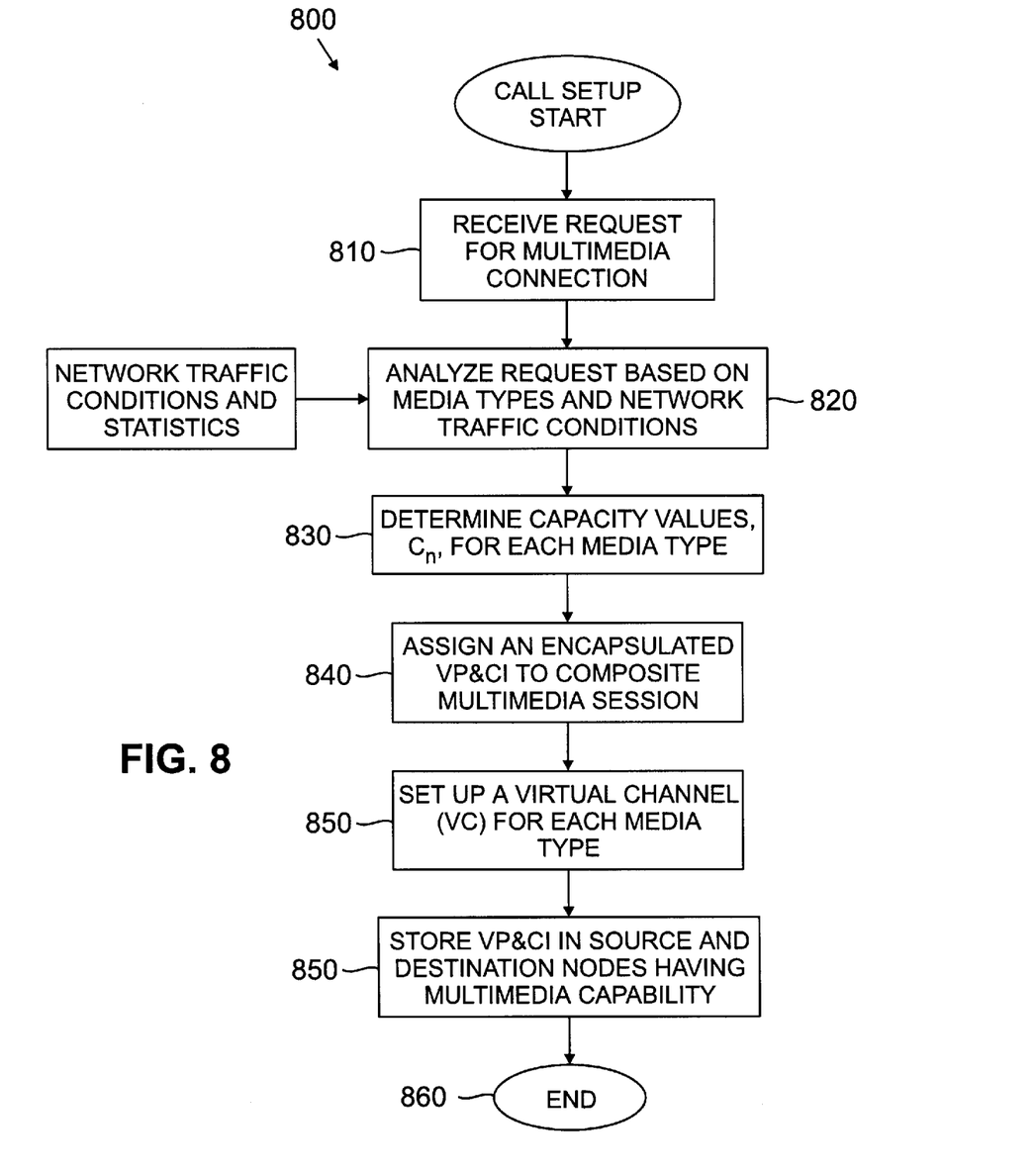
FIG. 8 is a flow chart describing an exemplary multimedia call handler process that may be utilized by the access node of FIG. 3.

In order to include the VP&CI in the header 232, there must be a change in the ATM cell structure, or packet or frame structure in non-ATM networks. Another preferred embodiment, which would not require any change in the existing cell, packet or frame structures, is discussed hereinafter. During call setup, a signaling message carries the VPI/VCI values of the individual monomedia connections between the source and destination nodes 300. The VP&CI is carried through this signaling message to each destination node 300 with multimedia capability and stored there by the multimedia call handler process 800.

Likewise, signaling in circuit switched networks is accomplished using CCS7 (Common Channel Signaling #7), or other signaling techniques. The task of signaling in ATM and packet networks is usually accomplished using pre-specified VP/VC's allocated for signaling. Generally, signaling can be performed inband or out-of-band.

Figure 3:
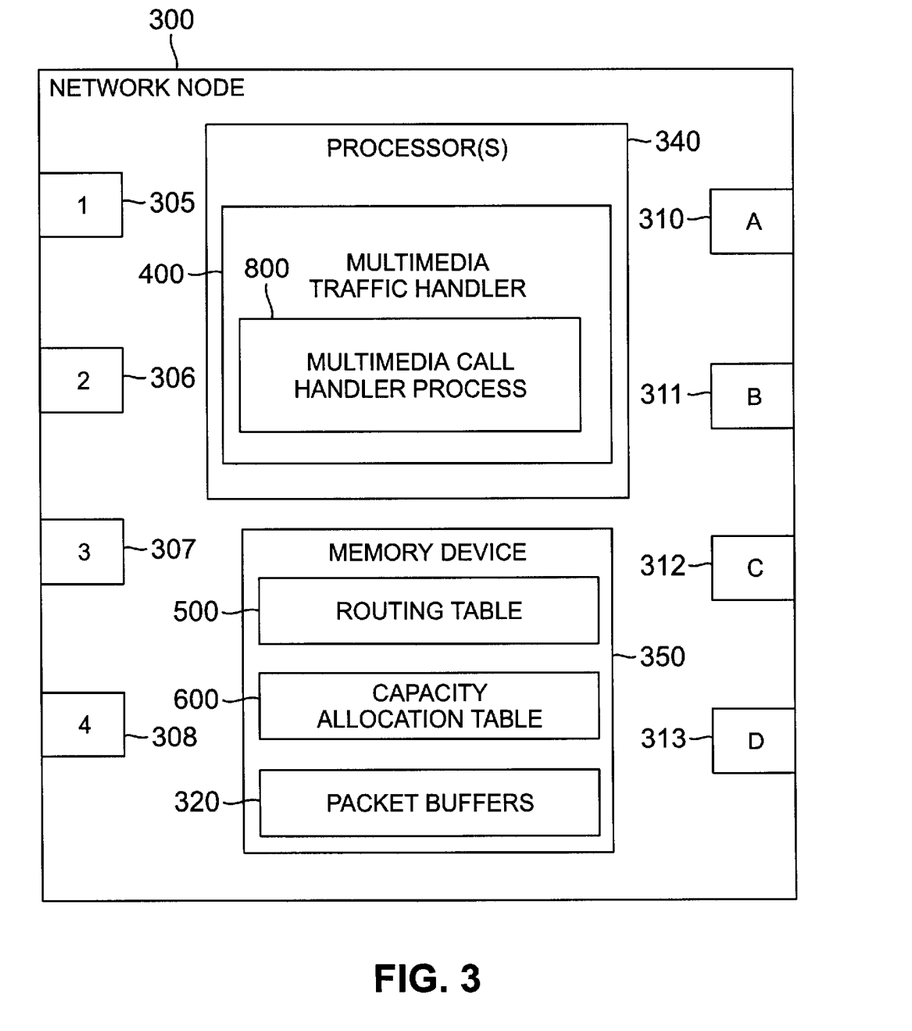
FIG. 3 is a schematic block diagram of an exemplary node in the ATM network of FIG. 1.

As shown in FIG. 3, a network node 300 may be comprised of one or more input ports, such as the input ports 305 through 308, and one or more output ports, such as the output ports 310 through 313. The network node 300 includes at least one processing unit 340, which may be embodied as a single processor, or a number of processors operating in parallel. In addition, the network node 300 includes a memory device 350 for storing a routing table 500, the capacity allocation table 600, each discussed further below in conjunction with FIGS. 5 and 6, respectively, and packet buffers 320. By definition, a cell received at a leaf node is destined for a local process executing on the node. The leaf node will preferably store the cells received for a given packet in a packet buffer 320, until the complete packet is received, for example, as indicated by an end-of-packet (EOP) bit. Once the complete packet is received, the packet will be passed to the appropriate process.

Figure 4:
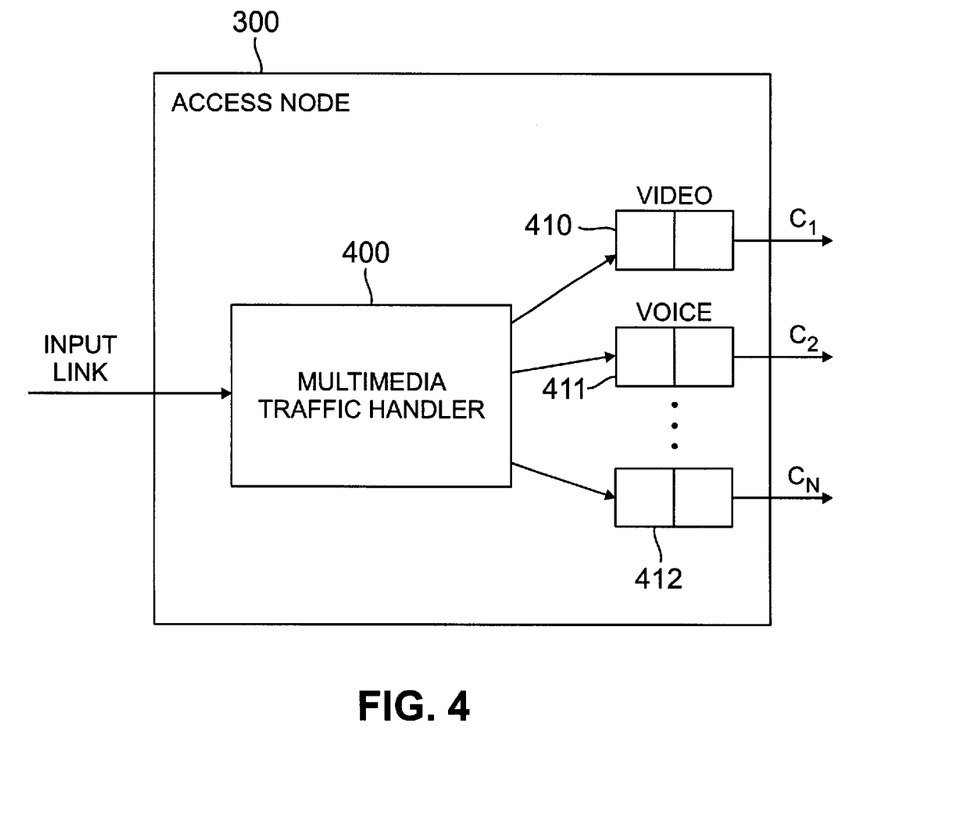
FIG. 4 illustrates in greater detail the multimedia traffic handler of FIG. 3.

According to a feature of the present invention, each access node 300 preferably includes a multimedia traffic handler 400, shown in further detail in FIG. 4, and a multimedia call handler process 800, shown in FIGS. 3 and 8. The multimedia traffic handler 400 will separate each monomedia stream from a composite multimedia signal and transmit it to a different buffer 410–412, each associated with a connection having a capacity, $C_n$. In addition, the multimedia call handler process 800, discussed below in conjunction with FIG. 8, will receive a connection request associated with a given multimedia session during the call connection phase, analyze the types of media included in the session and network conditions, and will thereafter determine the desired capacity values, $C_n$, to be assigned to each monomedia component. The multimedia traffic handler 400 will then request connections for each monomedia component from source to destination with the desired capacity values, $C_n$, in the same manner that a connection is requested in a conventional network for an integrated multimedia stream.

The encapsulated Virtual Path and Circuit Identifier (VP&CI) 240 is generated by the multimedia traffic handler 400 at the source node 300, where the capacities, $C_n$, for the various monomedia components are also determined. At the destination node, the encapsulated Virtual Path and Circuit Identifier (VP&CI) 240 is retrieved from the header information, or from the multimedia call handler process 800, and utilized to associate the different components of multimedia connections to reproduce the original multimedia session. After a multimedia session is established, the individual monomedia connections utilize conventional network routing procedures.

Figure 5:
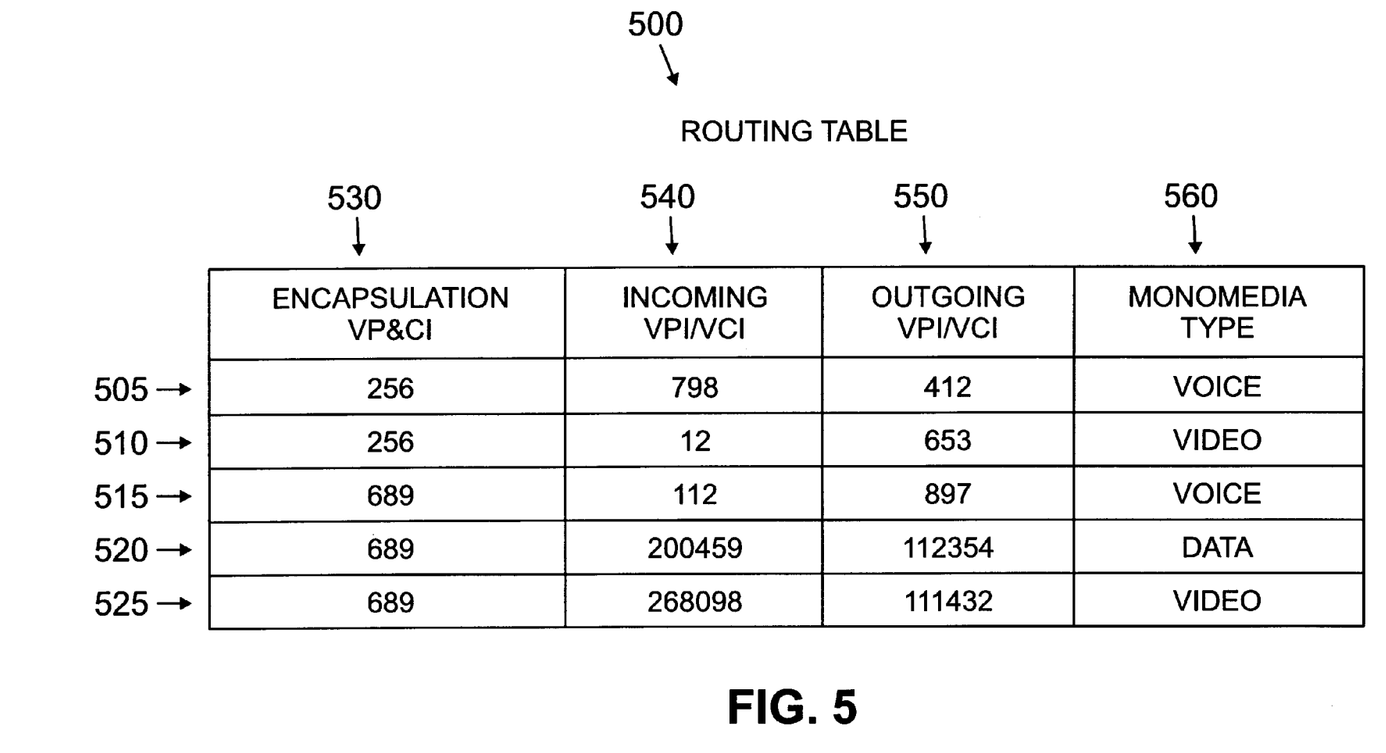
FIG. 5 illustrates a sample table from the routing table of FIG. 3.

As indicated above, the routing information stored in each node of the network 100 includes a routing table 500, illustrated in FIG. 5. In an ATM network, for example, the routing information stored in the routing table 500 is entered during the call connection establishment phase by the processor 340, and will remain constant for the duration of a call. As shown in FIG. 5, the routing table 500 will preferably be comprised of columns 530 through 560. An encapsulated Virtual Path and Circuit Identifier (VP&CI) column 530 is populated with the identifier, which has been assigned to the respective multimedia session. As previously indicated, the encapsulated Virtual Path and Circuit Identifier (VP&CI) is preferably mapped to the identifiers of the individual VP/VC identifiers assigned to each monomedia component within the composite multimedia signal. An incoming VP/VCI column 540 is populated with the VPI/VCI values associated with connections through the respective node 300. Thus, each row of the table 500, such as the rows 505 through 520, is indexed by a different VPI/VCI value. The outgoing VPI/VCI column 550 is populated with the outgoing VPI/VCI value, for connections passing through the node, or an address for one or more packet buffers 320, where the various monomedia components of a composite multimedia session, having a given encapsulated VP&CI, will be accumulated, until the complete session is received, for connections where the respective node is the last node before the destination. Finally, an optional monomedia type column 560 can indicate the media type of each monomedia component. The media type may be utilized, for example, to add additional callers to a conference call in progress.

Figure 6:
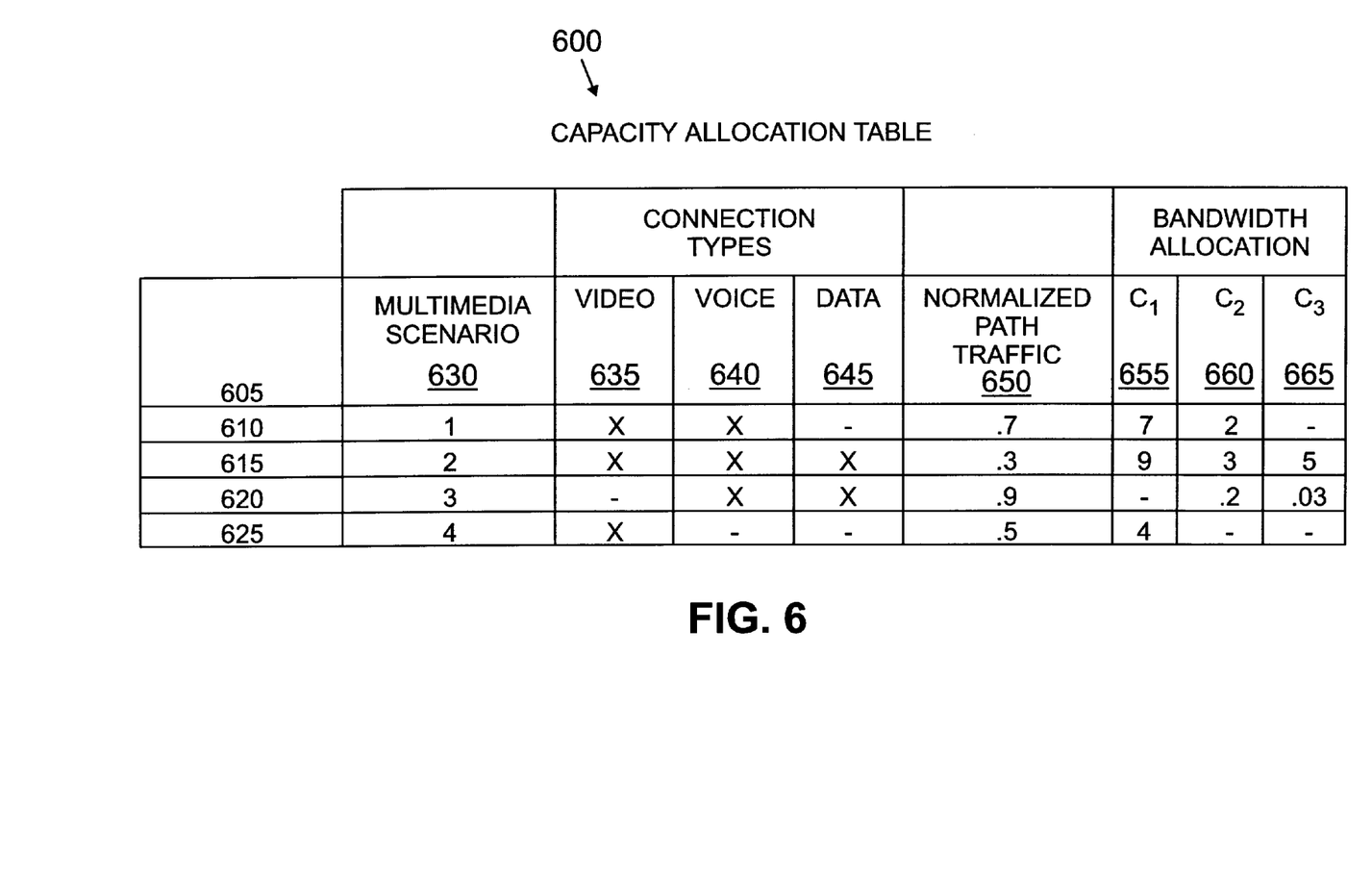
FIG. 6 illustrates a sample table from the capacity allocation table of FIG. 3.

FIG. 6 illustrates an exemplary capacity allocation table 600, that preferably stores capacity values, $C_n$, that will be assigned to each monomedia connection based on the types of media included in the session, and current network conditions at call setup time. The capacity, $C_n$, corresponds to the bandwidth that should be allocated to the respective monomedia component for the duration of the call. The capacity allocation table 600 maintains a plurality of records, such as records 605–625, each associated with a different multimedia scenario. For each multimedia scenario identified in field 630, the capacity allocation table 600 indicates the types of media included in the session in fields 635 through 645, an indication of the normalized path traffic in field 650, and the corresponding capacity values, $C_n$, in fields 655 through 665 that should be assigned to each monomedia connection included in the composite multimedia signal.

Figure 7:
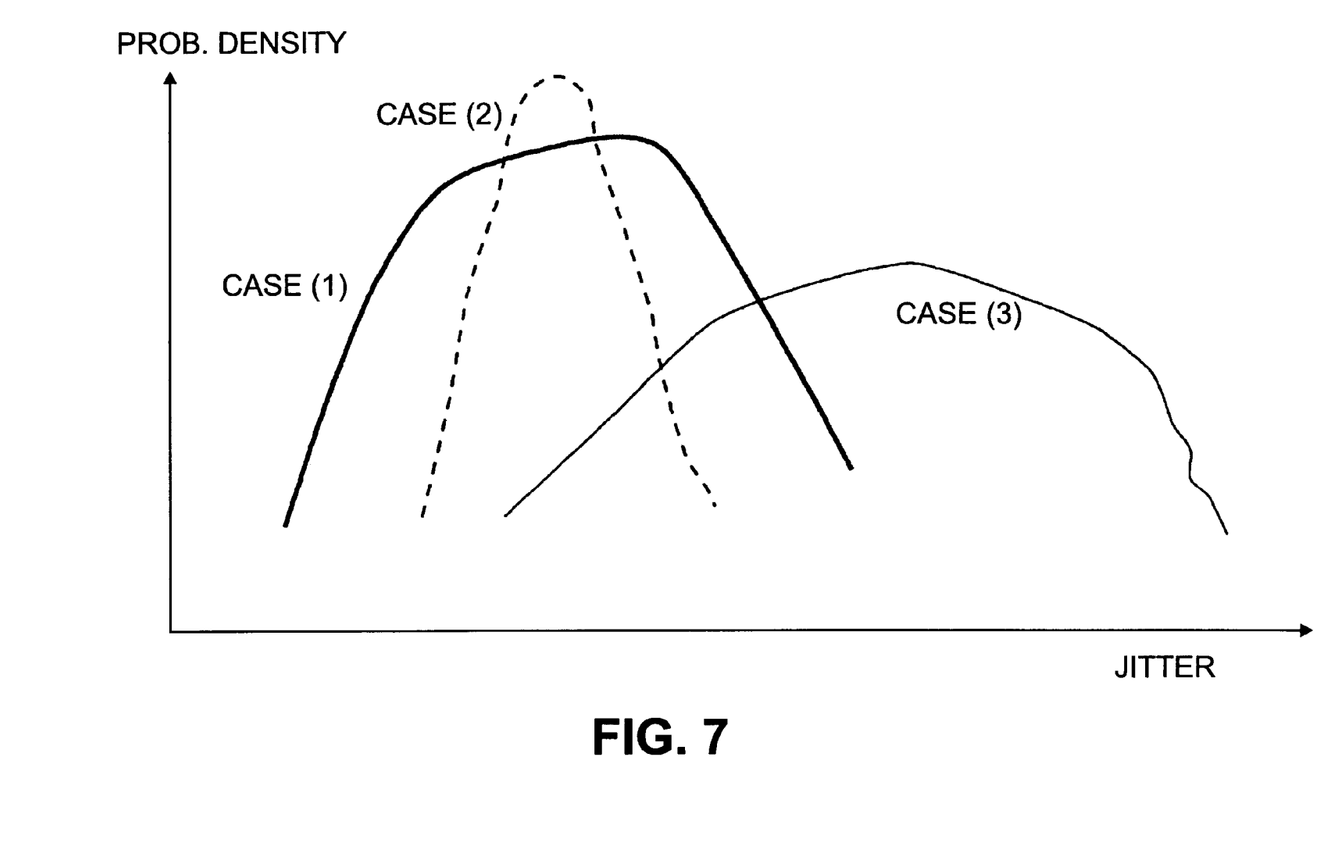
FIG. 7 graphically illustrates the probability density function of jitter for various multimedia scenarios.

As previously indicated, the capacity, $C_n$, values stored in the capacity allocation table 600 for each monomedia connection are based on the types of media included in the session, and network conditions and can be obtained from experimental or statistical profiles of various multimedia type sessions. The capacity, $C_n$, is a "measure" of the bandwidth in appropriate units, such as kilobits-per-second (Kbps). The capacity, $C_n$, values may be predetermined or may be calculated in real-time at call-setup. The normalized path traffic can be obtained, for example, by sending test messages, such as Resource Management Cells in an ATM network, from the source to the destination prior to connection set-up, where the network elements along the path would include information about their traffic and congestion status, as well as other parameters. A typical probability density function of inter-stream cell delay (jitter) is shown in FIG. 7. The shape of the probability density function depends on the characteristics of the multimedia traffic, the spatial correlation among the monomedia streams, buffer size, as well as the capacities allocated to each monomedia stream. In the illustration of FIG. 7, case 3 produces the worst jitter since it has the largest standard deviation, and case 2 exhibits the best jitter distribution. Thus, in order to assign values of capacity, $C_n$, to each monomedia component under various network conditions, various values of capacities can be analyzed and the combination providing the smallest standard deviation can be selected.

As previously indicated, each node 300 which may serve as an access node, includes a multimedia call handler process 800, illustrated in FIG. 8, which will (i) receive a connection request associated with a given multimedia session during the call connection phase, (ii) analyze the types of media included in the session, and network conditions, (iii) determine the desired capacity values, $C_n$, to be assigned to each monomedia component and stored in the capacity allocation table 600 and thereafter (iv) request connections from source to destination with the desired capacity values, $C_n$, for each monomedia component. As shown in FIG. 8, the multimedia call handler process 800 will begin executing during step 810 upon receipt of a request for a multimedia connection.

Thereafter, the multimedia call handler process 800 will analyze the request during step 820 based on media types and network traffic conditions. As previously indicated, network traffic conditions can be obtained, for example, by sending test messages, such as Resource Management Cells in an ATM network, from the source to the destination prior to connection set-up, where the network elements along the path would include information about their traffic and congestion status, as well as other parameters. Thereafter, the multimedia call handler process 800 will determine the capacity, $C_n$, values for each media type, for example, by analyzing various values of capacities and the resultant probability density function. In such an embodiment, the combination providing the smallest standard deviation is selected.

The multimedia call handler process 800 will assign an encapsulation Virtual Path and Channel Identifier (VP&CI) to the multimedia session during step 840, and then establish a virtual channel for each media type during step 850. Thereafter, the assigned VP&CI value for the multimedia session is preferably stored in the source and destination nodes during step 855. It is noted that the VP&CI value can be conveyed to the nodes with the header information, or by means of signaling techniques, as discussed above. Finally, program control terminates during step 860.

It is noted that the values of capacity, $C_n$, can be assigned end-to-end for the entire length of the call, or may be chosen differently for each link at each node 300 across the network 100. In this alternate embodiment, as a call request signal traverses between source and destination, each node 300 would assign appropriate capacity values, $C_n$, based on the type of multimedia call request, monomedia components comprising the call, and traffic conditions. Of course, the assigned capacities can be dynamically adjusted during a call, to reflect variations in network traffic.

It is to be understood that the embodiments and variations shown and described herein are merely illustrative of the principles of this invention and that various modifications may be implemented by those skilled in the art without departing from the scope and spirit of the invention.

We claim:

1. A method of transporting multimedia information across one or more heterogeneous networks from a source to a destination, said multimedia information consisting a plurality of types of monomedia components, said method comprising the steps of:

establishing a separate connection between said source and said destination for each of said monomedia components; and transmitting said monomedia components to said destination independently by means of said established connections.

2. The method according to claim 1, further comprising the step of allocating bandwidth to each of said connections to minimize jitter among said monomedia components.

3. The method according to claim 2, wherein said bandwidth is allocated to said connections between said source and said destination for the entire length of a session.

4. The method according to claim 2, wherein said bandwidth is allocated to each connection by one or more nodes between said source and said destination.

5. The method according to claim 2, wherein said bandwidth allocation is based on said monomedia components comprising the call and traffic conditions.

6. The method according to claim 2, wherein said bandwidth allocations are dynamically adjusted during a session to reflect variations in network traffic.

7. The method according to claim 1, wherein at least one of said networks is an asynchronous transfer mode network and said separate connections have a unique virtual channel identifier.

8. The method according to claim 1, wherein at least one of said networks is a circuit switched network and each of said separate connections have a unique telephone number.

9. The method according to claim 1, further comprising the step of assigning an identifier to said multimedia information.

10. The method according to claim 9, further comprising the step of storing said identifier at said destination.

11. The method according to claim 9, wherein said identifier is sent to said destination with header information.

12. The method according to claim 9, wherein said identifier is sent to said destination by means of signaling techniques.

13. The method according to claim 9, further comprising the step of recombining said monomedia components into said multimedia information using said identifier.

14. A method of transporting multimedia information across one or more heterogeneous networks from a source to a destination, said multimedia information consisting a plurality of types of monomedia components, said method comprising the steps of:

establishing a separate connection between said source and said destination for each of said monomedia components;

allocating bandwidth to each of said connections to minimize jitter among said monomedia components; and transmitting said monomedia components to said destination independenly by means of said established connections.

15. The method according to claim 14, wherein said bandwidth is allocated to said connections between said source and said destination for the entire length of a session.

16. The method according to claim 14, wherein said bandwidth is allocated to each connection by one or more nodes between said source and said destination.

17. The method according to claim 14, wherein said bandwidth allocation is based on said monomedia components comprising the call and traffic conditions.

18. The method according to claim 14, wherein said bandwidth allocations are dynamically adjusted during a session to reflect variations in network traffic.

19. The method according to claim 14, wherein at least one of said networks is an asynchronous transfer mode network and each of said separate connections have a unique virtual channel identifier.

20. The method according to claim 14, wherein at least one of said networks is a circuit switched network and each of said separate connections have a unique telephone number.

21. A system for transporting multimedia information across one or more heterogeneous networks from a source to a destination, said multimedia information consisting a plurality of types of monomedia components, comprising:

a multimedia traffic handler for establishing a separate connection between said source and said destination for each of said monomedia components; and at least one communications port for transmitting said monomedia components to said destination indpendently by means of said established connections.

22. The system according to claim 21, wherein said multimedia traffic handler further allocates bandwidth to each of said connections to minimize jitter among said monomedia components.

23. The system according to claim 22, wherein said bandwidth is allocated to said connections between said source and said destination for the entire length of a session.

24. The system according to claim 22, wherein said bandwidth is allocated to each connection by one or more nodes between said source and said destination.

25. The system according to claim 22, wherein said bandwidth allocation is based on said monomedia components comprising the call and traffic conditions.

26. The system according to claim 22, wherein said bandwidth allocations are dynamically adjusted during a session to reflect variations in network traffic.

27. The system according to claim 21, wherein at least one of said networks is an asynchronous transfer mode network and said separate connections have a unique virtual channel identifier.

28. The system according to claim 21, wherein at least one of said networks is a circuit switched network and each of said separate connections have a unique telephone number.

* * * * *